United States Patent
Brownscombe

[11] 3,733,126
[45] May 15, 1973

[54] STEP-BY-STEP DRIVE USEFUL IN MICROFICHE CAMERAS

[75] Inventor: Philip J. Brownscombe, Millington, N.J.

[73] Assignee: Eugene Dietzgen Co., Chicago, Ill.

[22] Filed: Aug. 4, 1971

[21] Appl. No.: 169,025

[52] U.S. Cl. ................355/54, 74/112, 355/86, 355/95
[51] Int. Cl. ..............................G03b 27/44
[58] Field of Search ................74/112; 355/53, 54, 355/86, 95

[56] References Cited

UNITED STATES PATENTS 3,299,776  1/1967  Baptie et al........................355/54 X
3,449,049  6/1969  Harding et al........................355/53

*Primary Examiner*—John M. Horan
*Assistant Examiner*—Richard A. Wintercorn
*Attorney*—Johnston, Root, O'Keefe, Keil, Thompson & Shurtleff

[57] ABSTRACT

A microfiche camera embodying a film-indexing mechanism for frame-by-frame and row-by-row exposure of the film in a grid-like fiche pattern, the drive embodying a first carriage mounted for linear movement on a frame, a second carriage mounted for linear cross-motion on the first carriage, and a step-by-step drive for each carriage including a ball screw, a traveler on the screw, a latch member on the traveler and a pivotable catch member bearing a plurality of projecting teeth with spacings between the teeth corresponding to a dimension of the fiche frames.

10 Claims, 10 Drawing Figures

INVENTOR:
PHILIP J. BROWNSCOMBE

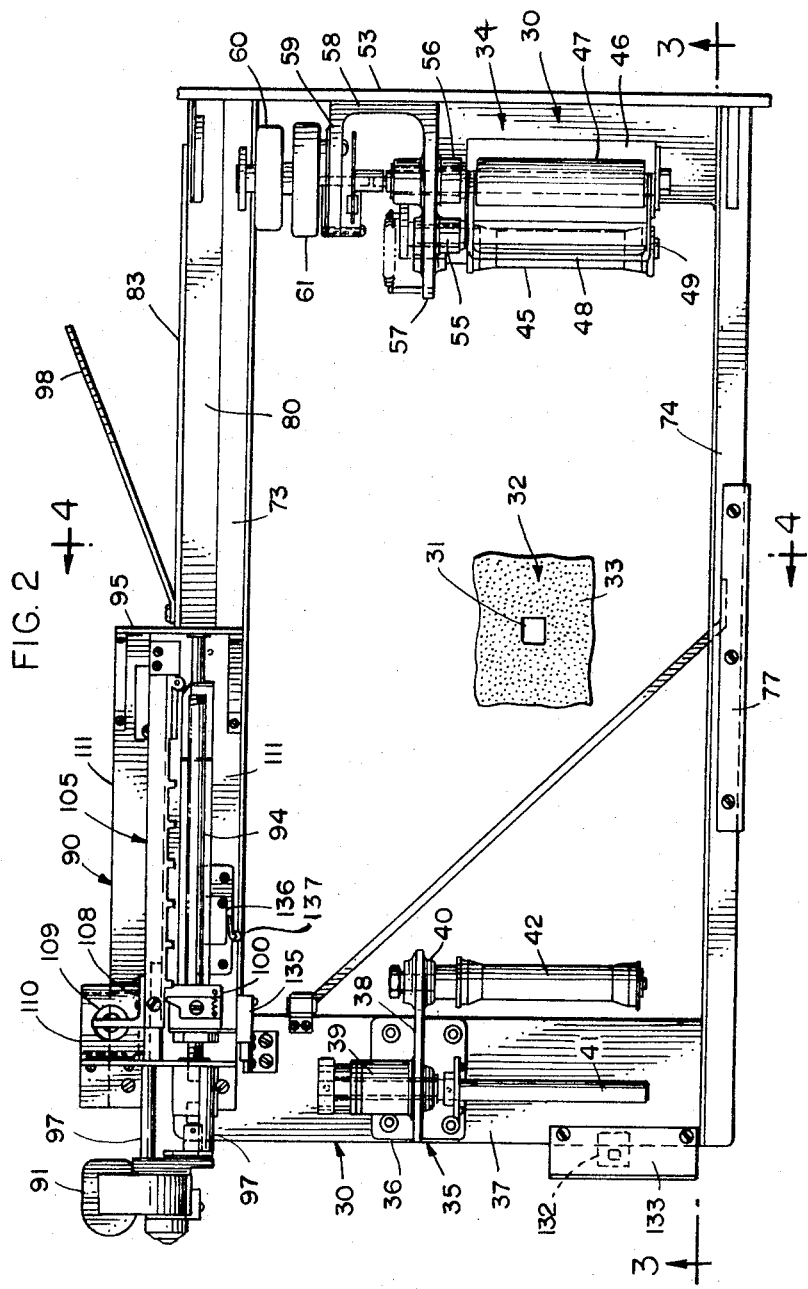

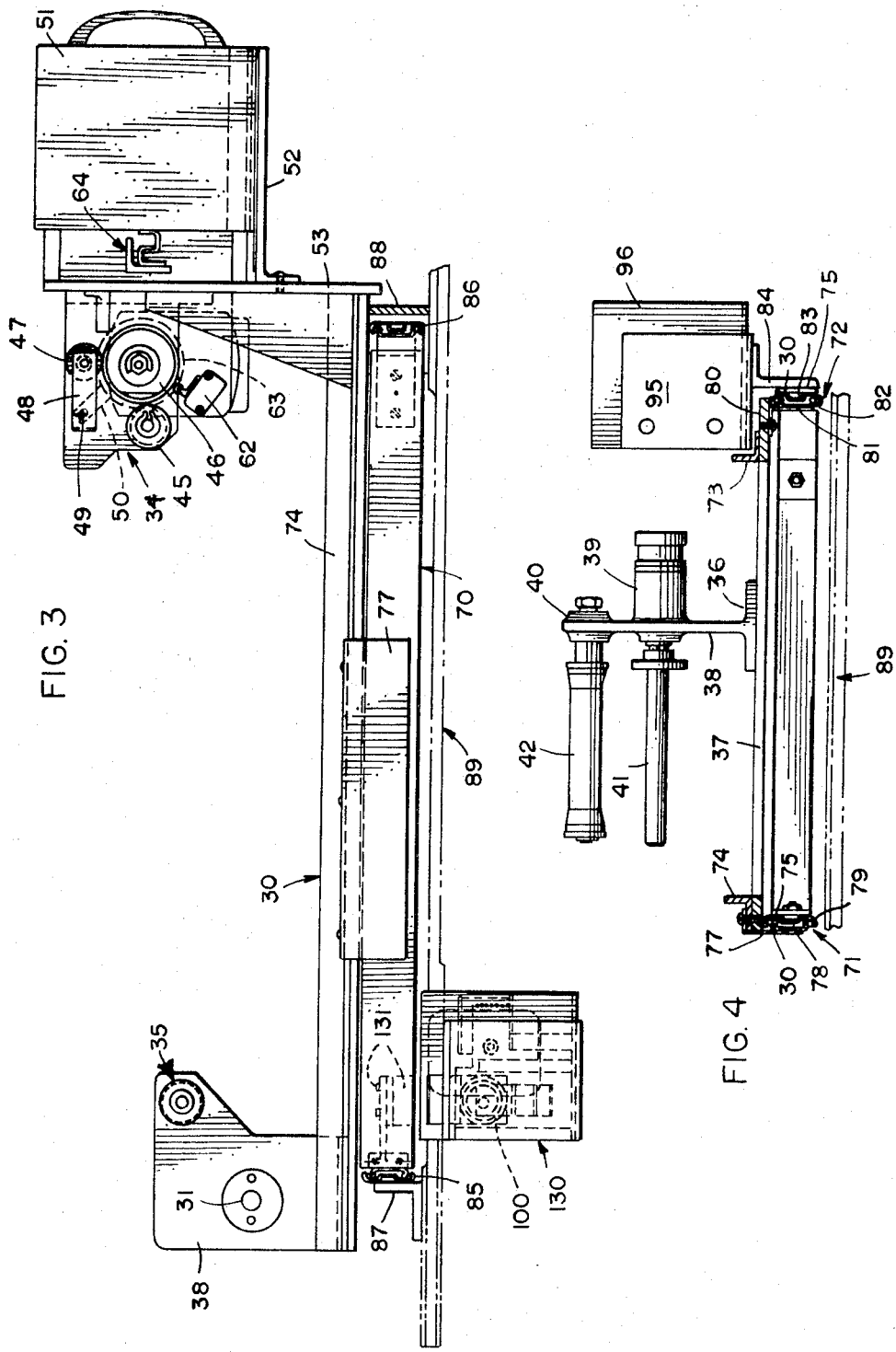

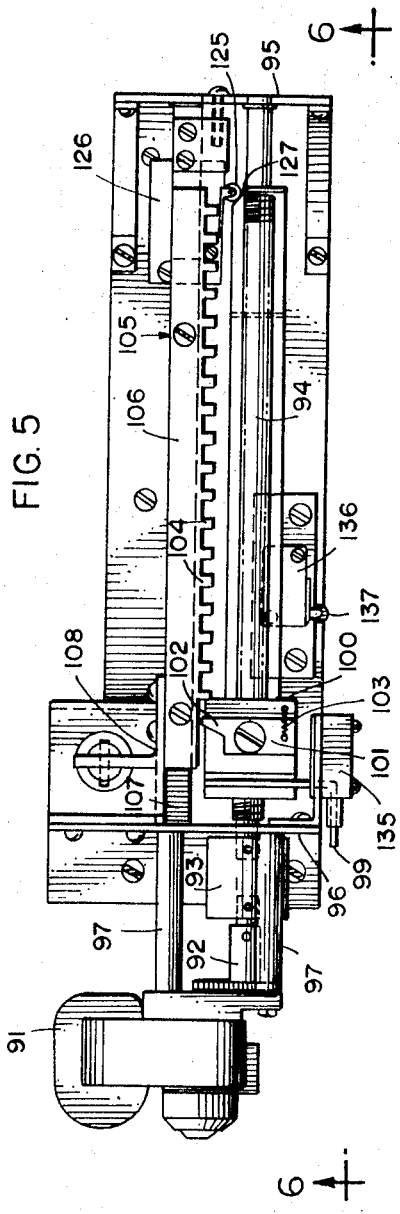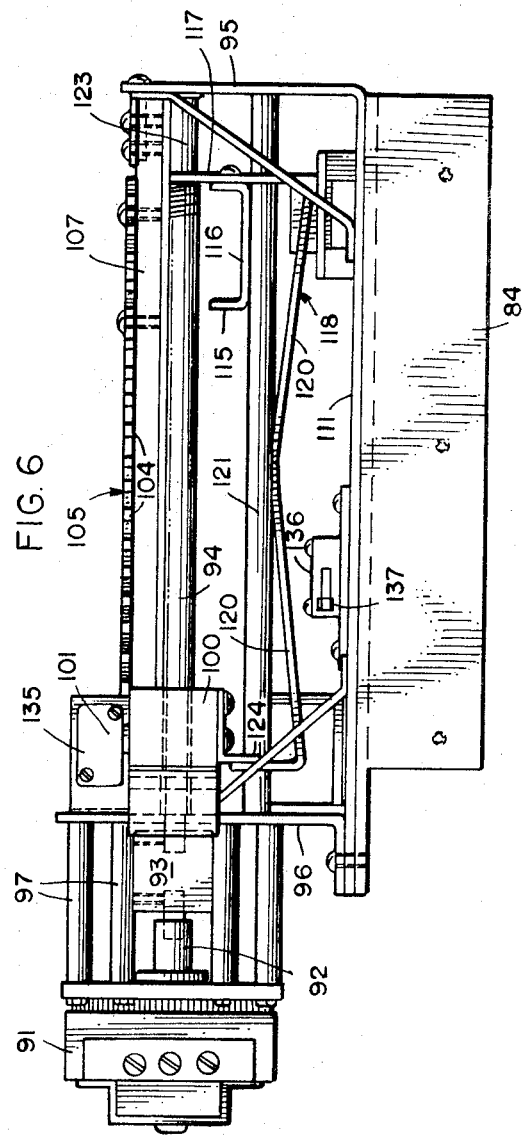

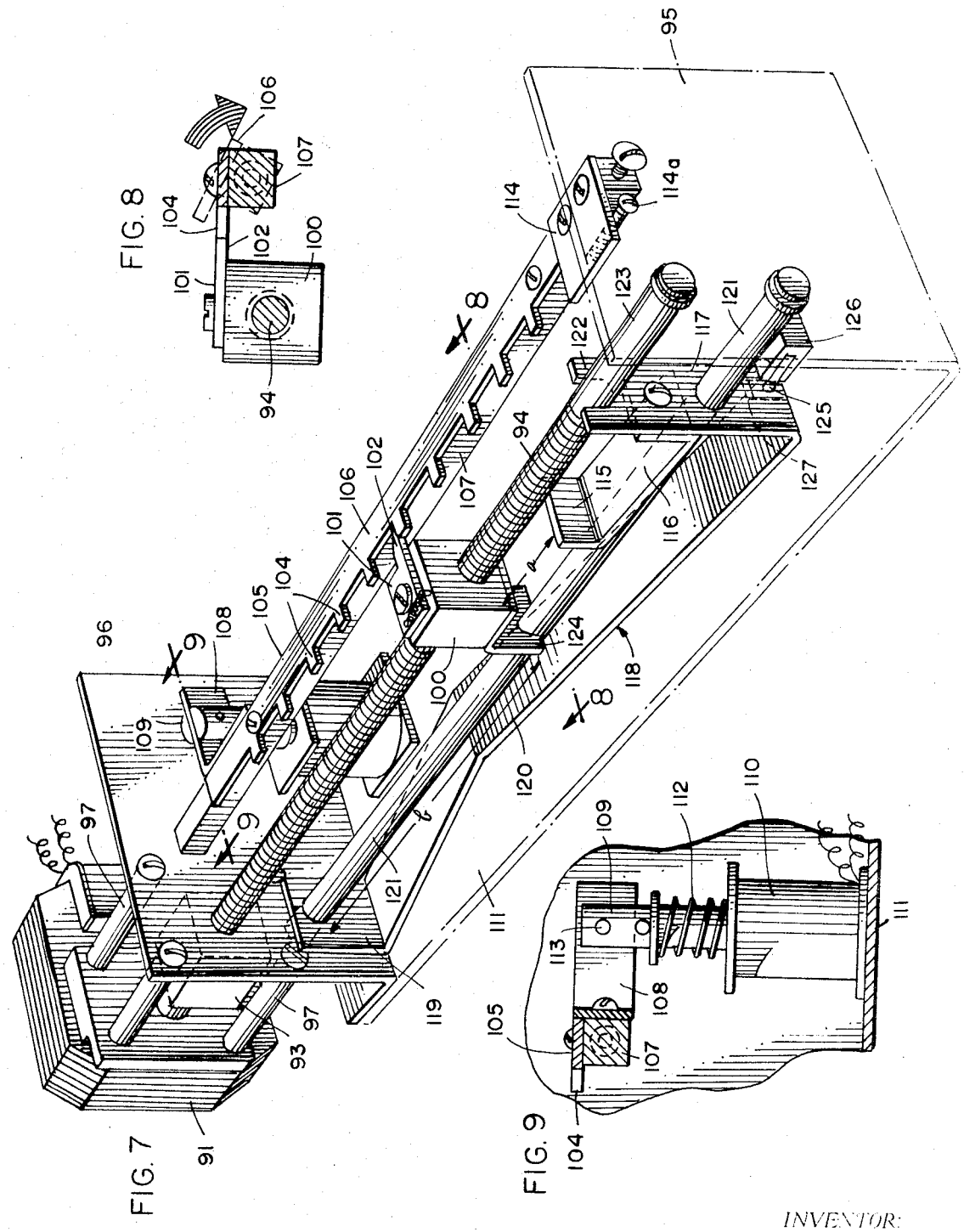

STEP-BY-STEP DRIVE USEFUL IN MICROFICHE CAMERAS

THE INVENTION

The subject invention pertains to microfiche cameras and more particularly pertains to step-by-step drive mechanisms for moving the film to obtain a plurality of exposures composed of a plurality of rows of frames. The film is a relatively wide roll of film, e.g., 105 millimeter film. To attain the grid-like arrangement of frames in the fiche, the film and the film support are moved across a small exposure aperture in the camera. The exposure aperture and the camera lens are fixed. The film and the film mounting assembly, including its supply and take-up spools or cassettes are mounted on a movable carriage. This movable carriage is in turn mounted on another movable carriage. The carriages are respectively movable linearly at right angles to each other.

During the frame by frame exposure of the fiche, one carriage moves linearly from one frame position to the next in a given row. When the row of frames is completely exposed, the carriage returns to the first frame position while the other carriage moves the film down to the next row. This process continues until the last frame in the last row has been exposed, after which the film is advanced by one fiche length when the carriages are returned to a position for exposing the first frame in the first row.

The improvements of the subject invention are primarily concerned with the drive unit assemblies for the respective carriages. These drive unit assemblies are outstanding in their accurately constant distance of movement from frame to frame and row to row. The drive units embody a torque motor which is impedance protected and remains constantly energized. The torque motor drives a ball screw through reduction gearing. A traveler, e.g., a traveling nut, moves linearly along the ball screw as it rotates. The traveling nut carries a latch having a finger adapted to stop the motion of the torque motor and ball screw by engagement of one of a plurality of linearly spaced teeth or projections lying in the path of the finger.

The teeth or projections preferably project from a common base member. The teeth and base member may be an elongated plate with the teeth projecting from a longitudinal edge of the plate in comb-like fashion. The teeth are spaced at constant distances corresponding to the desired spacings of the frames along the rows of the fiche or the spacings of the rows in the case of the cross motion drive assembly.

The traveling nut and its latch move from tooth to tooth by a momentary movement of the teeth-bearing member sufficiently so that the latch clears the abutting tooth. The constantly energized torque motor resumes its rotating drive of the ball screw until the latch contacts the next tooth, at which time the ball screw and traveling nut again stop.

A preferred technique for moving the teeth into momentary clearing relationship with the latch embodies the use of the aforedescribed comb-like structure. The plate or base member is rotated about its longitudinal axis over a small arc sufficient to clear the teeth of the latch. This is done conveniently by momentarily energizing a solenoid, the movable arm of which is coupled to the comb-like member to effect the aforesaid rotation.

The above described drive eliminates all lost motion or backlash by virtue of the constantly energized torque motor and the stoppage thereof only by engagement of the latch against a respective tooth. This drive always forces the traveling nut and its latch in the same direction against the comb teeth. Registration accuracy in the step-by-step motion of the drive assemblies, accordingly, is limited only by the accuracy of the spacing of the latch-engaging edges of the respective teeth.

When the latch passes the last tooth, the traveling nut engages a projection which activates a reversing switch in the circuit of the torque motor. This is done conveniently by engagement of the nut with a projection on a slidable member which moves in the direction of the nut until the slidable member actuates a reversing switch. With the screw drive reversed in its direction of rotation, the traveling nut moves from the sliding member with the latter still in activating engagement with the reversing switch. The nut returns past its initial, first frame position and then forces the sliding member back until the reversing switch returns to its forward drive position in the circuit of the torque motor. Forward motion of the traveling nut is resumed until its latch engages the first tooth.

The latch is mounted on the traveling nut so that it can pivot and pass over each tooth during the reverse travel of the nut. Just before the traveling nut actuates the reversing switch, another switch is activated to energize the solenoid of a similar torque motor-ballscrew-traveling nut and latch-toothed catch drive assembly for the other carriage to move the latter carriage one step and position the film for exposure of another row. After exposure of the last row of frames, said other carriage is returned to the first row in the same manner.

THE DRAWINGS

A preferred embodiment of the invention is illustrated in the drawings wherein:

FIG. 2 is a top plan view of a carriage, film reeling device and the film-indexing, step-by-step drive assembly for said carriage;

FIG. 3 is a side elevation of the carriage of FIG. 2 and shows the latter's mounting on the second, cross-motion carriage, a fixed frame, and a second film-indexing, step-by-step drive assembly for the second, cross-motion carriage;

FIG. 4 is a section view taken on section plane 4—4 of FIG. 2;

FIG. 5 is an enlarged, top plan view of the film-indexing drive assembly shown in FIG. 2;

FIG. 6 is a side elevation thereof as viewed from plane 6—6 of FIG. 5;

FIG. 7 is an enlarged, perspective view of the frame-indexing drive step-by-step assembly;

FIG. 8 is a section view taken on section plane 8—8 of FIG. 7 through the threaded spindle and multi-toothed catch member;

FIG. 9 is a fragmentary, section view taken on section plane 9—9 of FIG. 7; and

DESCRIPTION OF THE PREFERRED EMBODIMENT

Figure 10:
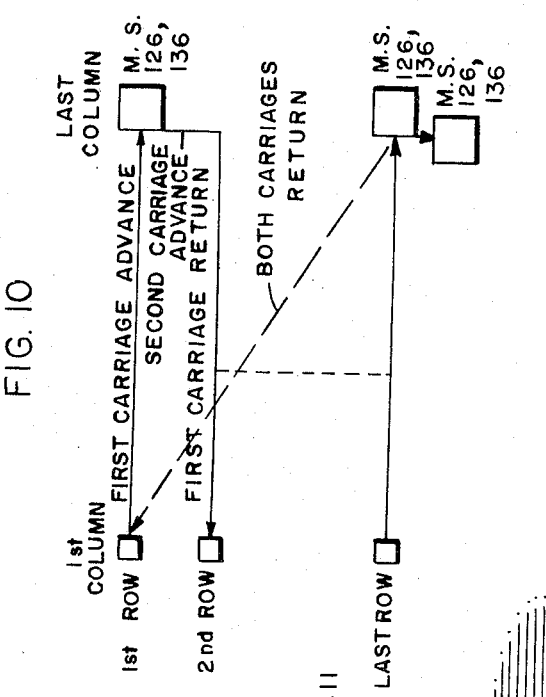
FIG. 10 is a diagram showing the sequence of indexing movement of the two carriages during exposure of a complete fiche.
Figure 1:
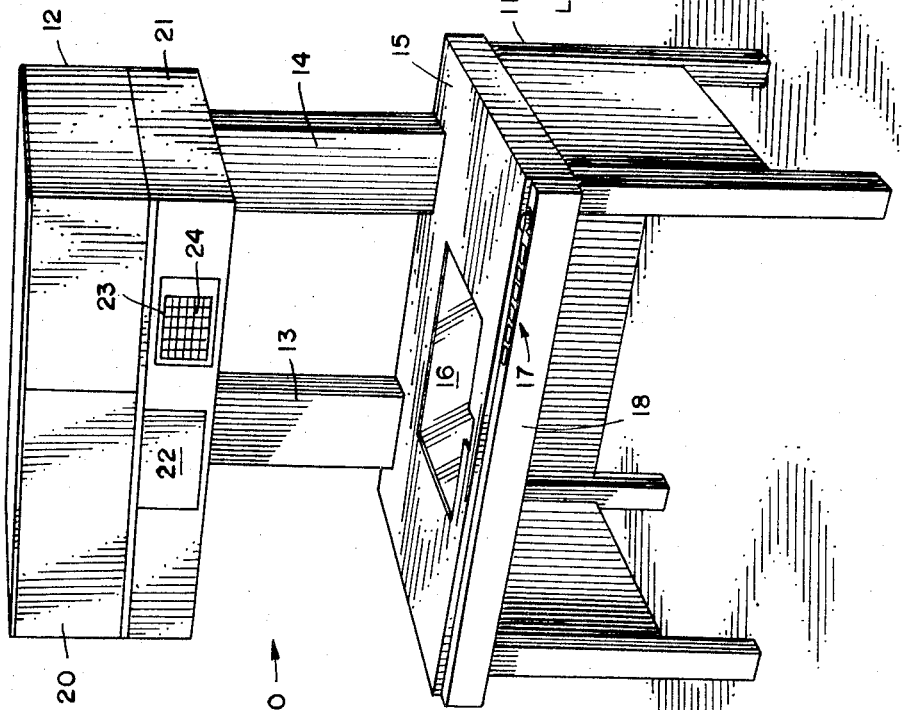
FIG. 1 is a front, perspective view of the microfiche camera.

Referring to the drawings, the microfiche camera 10 comprises a base member or table 11 having a lightproof camera cabinet 12 suspended thereover on the supporting columns 13 and 14. The top 15 of the member 11 has a well 16 in which the material to be photographed is placed. This well is lighted by lighting means (not shown) provided on the camera 10.

A push-button switch panel 17 is mounted on the upper edge of a hollow wiring channel or box 18 attached to the front edge of the top 15. The wiring (not shown) extends in harness fashion from the box or channel 18 to the rear of the table 11 and up the column 13 into the camera cabinet 12.

The camera cabinet 12 has a lightproof housing composed of the fixed, lower housing segment 21 and the removable housing cover 20. The front face of the lower housing segment 21 has a door 22 providing access to a titling device, which is the subject of an application of Melvin E. Lehto filed concurrently herewith. The front face also has a film position indicator 23 having a front, translucent screen 24 subdivided into rows and columns corresponding to the frames of the microfiche. A lighted spot moves from frame to frame on the screen and designates the indexing position of the frame relative to the exposure aperture of the camera.

Referring now to FIGS. 2 ff., the film-indexing unit comprises a first carriage 30 adapted to move the film longitudinally in step-by-step fashion relative to the frame exposure aperture 31 in the film supporting plate 32, shown in fragment in FIG. 2. The film lies on the upper surface 33 of this plate in proper focus in the camera.

The film is borne on the carriage 30 by a film feed unit 35 and a film take-up unit 34. The feed unit 35 comprises a base plate 36 attached to the cross-plate 37 of the carriage 30. A vertical plate 38 projects upwardly from the base plate 36 and carries a pair of hubs 39 and 40. A spindle 41 is rotatably journalled in the hub 39. It receives and rotatably supports a spool or cartridge of unexposed film, which passes over the film guide roller 42, the axle of which is supported at one end by the hub 40.

At the take-up end, the film is drawn under guide roller 45 and over the driven roller 46. The film is held in frictional contact with the driven roller 46 by the pressure, idler roller 47. The latter is rotatably supported on the U-frame 48. The latter is pivotally supported by a rod 49 extending transversely between the legs of the U-frame in the slotted ends of a pair of support arms 50. The film passes from the driven roller 47 into a removable, take-up cartridge 51, which is supported in the camera on a platform 52 fixedly attached to a vertical support plate 53, which in turn is fixedly mounted on the carriage 30.

The rollers 45 and 46 are respectively rotatably journalled in hubs 55 and 56 provided on the leg 57 of the U-frame 58. The base of the latter is fixedly attached to the vertical plate 53. The other leg 59 of the U-frame 58 carries a drive motor 60 and its reduction gear 61 for rotatably driving the take-up drive roller 46.

The motor 60 is energized after complete exposure of a fiche either automatically after the last frame has been exposed or via a film-advance switch in the switch bank 17. This advances the film one fiche length over the fixed film-support plate 32, the advancing drive being terminated by opening circuits of the motor 60 by the tripping of a microswitch 62. The latter occurs after one revolution of the film drive roller 46 through movement of the microswitch follower into a notch in the periphery of the ring 63, which rotates with the roller 46. A film slicing unit 64 of conventional structure may be interposed ahead of the cartridge 51 for cutting the film at any point to enable removal of the cartridge and the exposed film contained therein.

The carriage 30 is supported on the frame 70, of a second, cross-motion carriage by a pair of roller assemblies permitting the carriage frame 30 to move linearly relative to the carriage frame 70. The roller assemblies 71 and 72 are provided on the side bars 73 and 74 of the first carriage frame 30 and the end bars 75 of the frame 70 of the second carriage.

The side bar 74 has an inverted L-bracket or plate 77 mounted on and depending therefrom. An inner, ball bearing-supporting slide 78 is secured to the inner face of depending leg of the member 77. An outer ball bearing-supporting slide 79 is mounted on the outer face of the end bars 75 of the second carriage frame 70.

On the side bar 73, a support plate 80 attached to the underside of the bar 73 supports via the inverted angle bracket 81 an inner, ball bearing-support slide 82 of the assembly 72. The outer ball bearing-support slide 83 is supported on the end bar 75, which is part of the frame 70 of the second carriage.

The frame 70 of the second carriage is mounted for linear cross-motion relative to the linear motion of the frame 30 of the first carriage by similar ball bearing slide assemblies 85 and 86 shown in FIG. 3. The slides of these assemblies are respectively mounted on the outer faces of the side members of the frame 70 and on angle bars 87 and 88. The latter are components of the fixed frame 89 of the camera.

The indexing drive 90 for step-by-step movement of the first carriage frame 30 is illustrated in detail in FIGS. 2 and 5–7. It is mounted on and supported by the angle bar 84, a component of the frame 70 of the second, cross-motion carriage.

The indexing drive comprises a constantly energized, impedance protected, torque motor 91 with reduction gearing. The output shaft 92 thereof is connected by coupling 93 to the ball screw 94, one end of which is rotatably journalled in the end plate 95 of the indexing drive assembly. The other end is journalled in the end plate 96 of such assembly. The motor 91 is supported on the frame plate 96 by the rods 97.

The ball screw 94 carries a traveling nut 100 adapted to move linearly along the screw as it rotates. A latch member 101 having a latch finger or projection 102 is pivotally mounted on top of the traveling nut 100. The latch 101 cannot pivot counterclockwise as viewed in FIGS. 2 and 5 beyond the position therein shown and is yieldably urged into this position by the spring 103.

The latch finger 102 will engage sequentially any one of the teeth or projections 104 of the catch member 105. This catch member preferably has a comb-like construction in the form of a flat bar or strip 106 with the teeth 104 projecting at predetermined, regularly spaced intervals from a longitudinal edge thereof. When the latch finger 102 engages the side of a given tooth 104, the traveling nut comes to a positive stop, thereby also stopping the rotation of the ball screw 94 and its drive via torque motor 91. The constant energization of the torque motor 91 holds the latch finger 102 tightly against the side of the tooth 104 — precluding any lost motion or backlash which might occur if the motor were de-energized each time an indexing stop occurred. The travelling nut 100 is connected via bracket 99 to the frame 30 of the first carriage.

The step-by-step motion is attained by momentarily clearing the latch finger and abutting edge of a given tooth. This clearing is achieved by pivoting the catch member 105 sufficiently to allow the latch finger to pass beneath the tooth. For attaining this motion, the catch member 105 is fixedly attached to a bar 107, the ends of which are rotatably mounted in the plates 95 and 96. The rear side of the bar 107 is connected via L-bracket 108 to the rod 109 of a solenoid 110. The solenoid is mounted on the plate 111 of the frame of the indexing unit 90.

The rod 109 is biased resiliently upwardly by spring 112 and is pivotally connected to the L-bracket 108 by the pin 113. When the solenoid is not energized, the teeth 104 of the catch member 105 are in the plane of the latch finger 102. When the solenoid is energized, it draws the rod 109 downwardly, thereby pivoting as a unit the L-bracket 108, the bar 107 and the catch member 105. The teeth 104 are to be swung upwardly to an arc sufficient to allow the latch finger 102 to pass beneath the tooth. The solenoid need be energized only momentarily. When it is de-energized, the aforesaid pivotable unit pivots under the urging of spring 112 back to the latch finger-engaging position of the teeth 104. The indexing drive then stops when the latch finger engages the next tooth. A strike plate 114 attached to the end portion of bar 107 strikes the shank of bolt 114a to stop the catch member 105 with its teeth in finger-engaging position.

As the traveling nut 100 approaches the end of the ball screw 94, it strikes the vertical leg 115 of a U-bracket 116. This bracket is mounted on the vertical leg 117 of a slide 118 having a vertical leg 119 at the opposite end and an inverted V-strip 120 extending between said legs.

The vertical legs 117 and 119 are slidably mounted on a rod 121 extending between plates 95 and 96. The rod 121 extends through circular holes in the respective legs to afford the sliding movement 118 thereon. Rotation of this member on the rod 121 is precluded by a yoke 122 at the upper end of the leg 117, which yoke slides along the spindle portion 123 of the ball screw 94. Rotation of the traveling nut 100 about the ball screw 94 is precluded by a similar yoke 124 projecting downwardly from the bottom of the traveling nut and slidably embracing the rod 121.

When the traveling nut 100 strikes the leg 115, the sliding member is moved in the direction of motion of the traveling nut until the actuating member 125 of a reversing microswitch 126 is contacted by the notched segment 127. This contact occurs after the latching finger 102 has cleared tooth 104 corresponding with the last column of the fiche.

The microswitch 126 is connected in the electrical circuit for the motor 91. It reverses the drive rotation of the motor 91, which in turn drives the ball screw 94 in the reverse direction. The traveling nut returns down the ball screw but the slide member 118 does not move from its microswitch-engaging position. As the traveling nut returns down the ball screw, its latch 101 pivots clockwise as viewed in FIGS. 2, 5 and 7 when the latch finger 102 contacts each tooth.

The traveling nut 100 moves in the return direction until its yoke 124 strikes the vertical leg 119 of the sliding member 118. This occurs after the latch finger 102 has passed the first tooth 104. The latching member 118 is thus moved in a direction away from the microswitch 126, whereby the leg 117 no longer contacts the switch actuator 125. This reactivates the forward drive of the ball screw 94 by the motor 91, advancing the traveling nut 100 until the latch finger 102 contacts the first tooth. The indexing unit is now ready for exposure of the first frame in a row of the fiche.

The row-to-row film-indexing drive 130 (FIG. 3) for step-by-step movement of the second carriage frame 70 relative to the frame 89 is identical to the indexing drive illustrated in FIGS. 5–9. The number of teeth 104 thereof and the spacing therebetween correspond to the desired number of rows of the fiche and the center-to-center spacing of the respective rows. The frame of the indexing drive unit 130 is fixedly mounted to the frame 89. Its traveling nut 100 is coupled via bracket arms 131 to the cross-motion carriage frame 70.

The cross-motion carriage indexing drive 130 is activated just before the carriage frame 30 is reversed to return it to the first column position. This activation is achieved by momentarily energizing its solenoid 110 through microswitch 136 to allow movement of its latch finger to the next tooth 104 in the manner previously described for the indexing drive assembly for the frame 30 of the first carriage.

The switch 132 is a switch in the aforedescribed titling device. The strike bracket 133 on the frame 30 closes this switch only when the first carriage is in the first column indexing position, thereby permitting titling only when a completely unexposed row is available for titling purposes.

Switch 136 has a contact arm roller 137 which rides on the side bar 73. Just before the reversing switch 126 is actuated, the trailing end of side bar 73 passes the roller 137 to allow the latter to move and close the switch 136 momentarily, i.e., until side bar 73 contacts the roller again on the return stroke of the carriage 30.

The switch 135 is part of a conventional film advance circuit for advancing the film one fiche length via the film take-up assembly 34.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A camera for reproducing copy or other information on film as a microfiche composed of a plurality of frames in a grid-like arrangement of horizontal rows and vertical columns, which comprises a frame, a first carriage mounted for linear movement on said frame, a second carriage mounted for linear movement on said first carriage in a direction at right angles to the linear movement of said first carriage, film-supporting means mounted on one of said carriages, a film-exposure aperture, and film-indexing drive means for linear movement of respective carriages relative to said aperture to move said film relative to said aperture in frame-by-frame and row-by-row movement, the indexing drive means for at least one of the carriages embodying a constantly energized drive motor driving latch means held positively against each of a plurality of linearly spaced catch members adapted to stop said latch means and the drive thereof at spacings corresponding to the frame arrangement on said fiche, and means to momentarily release said catch members from said latch means to allow the latter to advance into positive engagement with the next catch member.

2. A camera as claimed in claim 1, said indexing drive means embodying a rotatably driven screw, said latch means embodying a traveler mounted on said screw for linear movement thereon as said screw rotates and a latch member on said traveler, said catch members being teeth disposed at regularly spaced intervals on a common base member in position to engage said latch member, and means for moving momentarily said teeth out of latch-engaging position a distance sufficient to clear the latch member relative to a given tooth and allow said traveler and latch member to advance along said screw until the latter engages the next tooth.

3. A camera as claimed in claim 2, said means for moving said teeth and base member momentarily being operated by a solenoid operatively connected to said base member.

4. A camera as claimed in claim 1, said motor being an impedance protected, torque motor.

5. A camera as claimed in claim 1, and switch actuating means activated by said traveler upon passing the last tooth for operating switch means in a circuit of said motor for reversing its drive rotation to return said traveler back to engagement with the first tooth.

6. A camera as claimed in claim 1, and means for activating the indexing drive means to move the other carriage one step to ready said film for exposure of another row of frames when a full row of frames has been exposed.

7. An indexing unit comprising an electric motor, a rotatable screw driven by said motor, a traveller mounted on said screw for linear movement thereon, a latch member on said traveller, a catch member having a plurality of teeth disposed at linearly spaced intervals in position to sequentially engage said latch member, and means for moving momentarily said teeth out of latch-engaging position a distance sufficient to clear the latch member relative to a given tooth and allow said traveller and latch member to advance along said screw until the latter engages the next tooth.

8. An indexing unit as claimed in claim 7, said motor being a constantly energized, torque motor whereby said latch member is held positively against the respective teeth when in latching engagement therewith.

9. An indexing unit as claimed in claim 7, said catch member embodying an elongated strip with said teeth projecting there from a longitudinal edge thereof, and means for rotating said catch member about its longitudinal axis, an amount sufficient to attain the momentary clearance of said teeth by said latch member.

10. An indexing unit as claimed in claim 9, a solenoid, and means operatively connecting said solenoid and said catch member to rotate the latter.

* * * * *